(12) United States Patent
Wagner

(10) Patent No.: US 12,497,806 B2
(45) Date of Patent: Dec. 16, 2025

(54) SYSTEM AND METHOD FOR CONTROLLING A STOP FUNCTION OR A DOOR OPENING FUNCTION OF A VEHICLE

(71) Applicant: Bayerische Motoren Werke Aktiengesellschaft, Munich (DE)

(72) Inventor: Armin Wagner, Karlsfeld (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 274 days.

(21) Appl. No.: 17/920,137

(22) PCT Filed: Apr. 16, 2021

(86) PCT No.: PCT/EP2021/059925
§ 371 (c)(1),
(2) Date: Oct. 20, 2022

(87) PCT Pub. No.: WO2021/213919
PCT Pub. Date: Oct. 28, 2021

(65) Prior Publication Data
US 2023/0160239 A1 May 25, 2023

(30) Foreign Application Priority Data
Apr. 21, 2020 (DE) ...................... 10 2020 110 733.1

(51) Int. Cl.
*E05B 81/56* (2014.01)
*B60K 28/12* (2006.01)
(Continued)

(52) U.S. Cl.
CPC .............. *E05B 81/56* (2013.01); *B60K 28/12* (2013.01); *B60K 35/60* (2024.01); *B60W 50/10* (2013.01);
(Continued)

(58) Field of Classification Search
CPC .......... E05B 81/56; E05B 81/04; E05B 77/54; B60K 28/12; B60K 35/60;
(Continued)

(56) References Cited

U.S. PATENT DOCUMENTS

2011/0285503 A1* 11/2011 Schuessler .............. E05B 81/78
340/5.72
2017/0074008 A1* 3/2017 Marlia .................... E05B 81/58
(Continued)

FOREIGN PATENT DOCUMENTS

| CN | 104992571 A | 10/2015 |
| CN | 110356360 A | 10/2019 |

(Continued)

OTHER PUBLICATIONS

German Federal Highway Research Institute (BASt), "Rechtsfolgen zunehmender Fahrzeugautomatisierung", Forschung kompakt, Bundesanstalt fuer Strassenwesen, Edition Nov. 2012 with English Abstract (two (2) pages).
(Continued)

*Primary Examiner* — Brian P Sweeney
*Assistant Examiner* — Alexander George Matta
(74) *Attorney, Agent, or Firm* — Crowell & Moring LLP

(57) ABSTRACT

A system controls a stop function or a door opening function of a vehicle. The system includes an actuating element which is designed to generate an actuation signal depending on an actuation by a vehicle occupant, and a control device which is designed to receive the actuation signal and, in response to receiving the actuation signal and depending on a travel velocity of the vehicle, to trigger either the stop function or the door opening function.

12 Claims, 4 Drawing Sheets

(51) Int. Cl.
*B60K 35/20* (2024.01)
*B60K 35/60* (2024.01)
*B60W 50/10* (2012.01)
*B60W 60/00* (2020.01)
*E05B 81/04* (2014.01)

(52) U.S. Cl.
CPC ......... *B60W 60/0016* (2020.02); *B60K 35/20* (2024.01); *B60K 2360/794* (2024.01); *E05B 81/04* (2013.01)

(58) Field of Classification Search
CPC ............ B60K 2360/794; B60W 50/10; B60W 60/0016; B60W 2520/10; B60W 2540/215; B60W 2720/10
See application file for complete search history.

(56) References Cited

U.S. PATENT DOCUMENTS

| | | | | |
|---|---|---|---|---|
| 2018/0188726 | A1* | 7/2018 | Newman | B60K 28/06 |
| 2018/0284793 | A1* | 10/2018 | Wood | G05D 1/0055 |
| 2019/0308612 | A1* | 10/2019 | Lavoie | B60R 25/34 |
| 2020/0198619 | A1* | 6/2020 | Glenn | B60W 30/181 |
| 2021/0269039 | A1 | 9/2021 | Kagerer et al. | |
| 2022/0126878 | A1* | 4/2022 | Moustafa | B60W 40/09 |

FOREIGN PATENT DOCUMENTS

| | | |
|---|---|---|
| DE | 102009055972 A1 | 6/2011 |
| DE | 102011117544 A1 | 5/2013 |
| DE | 10 2018 210 410 A1 | 1/2020 |
| DE | 10 2019 135 332 A1 | 6/2020 |
| EP | 0992386 A1 | 4/2000 |
| EP | 1 347 133 A2 | 9/2003 |
| EP | 2314490 A1 | 4/2011 |
| WO | WO 2018/183267 A1 | 10/2018 |

OTHER PUBLICATIONS

"(R) Taxonomy and Definitions for Terms Related to Driving Automation Systems for On-Road Motor Vehicles", Surface Vehicle Recommended Practice, SAE (Society of Automotive Engineering) International, J3016TM, Sep. 2016, pp. 1-30 (30 pages).

International Search Report (PCT/ISA/210) issued in PCT Application No. PCT/EP2021/059925 dated Jul. 9, 2021 with English translation (six (6) pages).

German-language Written Opinion (PCT/ISA/237) issued in PCT Application No. PCT/EP2021/059925 dated Jul. 9, 2021 (six (6) pages).

German-language Search Report issued in German Application No. 10 2020 110 733.1 dated Feb. 1, 2021 with partial English translation (12 pages).

Chinese-language Office Action issued in Chinese Application No. 202180029229.6 dated Feb. 24, 2025 with English translation (14 pages).

* cited by examiner

SYSTEM AND METHOD FOR CONTROLLING A STOP FUNCTION OR A DOOR OPENING FUNCTION OF A VEHICLE

BACKGROUND AND SUMMARY

The invention relates to a system and method for controlling a stop function or a door opening function of a vehicle. This can relate in particular to a vehicle which is designed for automated driving up to and including driverless driving.

The term "autonomous driving" can be understood for the purposes of this document to mean driving with automated longitudinal or lateral guidance, or autonomous driving with automated longitudinal and lateral guidance. The term "autonomous driving" covers automated driving with any degree of automation. Examples of levels of automation are an assisted, partially automated, highly automated or fully automated driving mode. These levels of automation have been defined by the German Federal Highway Research Institute (BASt) (see the BASt publication "Forschung kompakt [Research digest]", issue 11/2012). During assisted driving, the driver performs the longitudinal or lateral guidance all the time, while the system performs the other function within certain limits. In partially automated driving (PAD), the system takes control of the longitudinal and lateral guidance for a certain period of time and/or in specific situations while the driver has to constantly monitor the system, as in assisted driving. In highly automated driving (HAD), the system takes control of the longitudinal and lateral guidance for a certain period of time without the driver having to constantly monitor the system; however, the driver must be in a position to take control of the vehicle within a certain period of time. In fully automated driving (FAD), the system can automatically handle the driving in all situations for a specific application; for this application a driver is no longer required. The four automation levels listed above according to the BASt definition correspond to SAE levels 1 to 4 of the SAE J3016 standard (SAE—Society of Automotive Engineering). For example, highly automated driving (HAD) according to the BASt complies with level 3 of the SAE J3016 standard. In addition, SAE J3016 also provides SAE level 5 as the highest automation level, which is not included in the BASt definition. SAE level 5 is equivalent to driverless driving, in which the system can automatically handle all situations in the same way as a human driver throughout the entire journey; a driver is generally no longer required.

In the automotive sector, solutions are increasingly being developed for electrically opening the vehicle doors, i.e. for electrically actuating a vehicle door lock. One of the advantages of this is that mechanical connections between an actuation element and the actual vehicle door lock are no longer needed. By eliminating mechanical elements such as Bowden cables, there is greater design freedom for the shape of the vehicle doors.

In such solutions, an electrical actuation element such as a pushbutton is usually located on the inside and outside of each vehicle door, which can be operated by a person to trigger an electrical door opening function.

In some autonomous vehicles, operator controls by means of touch screens are installed for the persons being transported. These touch screens can be used to enter, for example, a destination for the journey, a start request for the journey, or other operating requests for vehicle functions, such as setting the air conditioning system. It may also be possible to enter e.g. an immediate stop request via a touch screen and thereby trigger an automated stop function, in particular an automated emergency stop function, of the vehicle.

For reasons of functional safety and safety in use, the stop request buttons that trigger this function should also be provided in every vehicle door, i.e. on the inside of every vehicle door. This has the advantage that if a touch screen fails, the stop request can still be executed.

In this context, the problem then arises that at least two buttons must be fitted in each vehicle door: one button for opening the door and another button with which the stop request or emergency stop request by the autonomously driven person can be indicated. These two safety-related switches must also be evaluated twice by respective sets of electronics and the corresponding signals forwarded, which means additional hardware is required.

There may also be a risk of confusion for the vehicle occupant.

The object of the invention is to provide a system and a method for controlling a stop function or a door opening function of a vehicle, which at least partially overcomes the disadvantages of solutions known from the prior art.

The object is achieved by the features of the independent patent claims. Advantageous embodiments are described in the dependent claims. It is pointed out that additional features of a claim that depends on an independent claim may constitute a separate invention independent of the combination of all the features of the independent claim either without the features of the independent claim or only in combination with a subset of the features of the independent claim, which invention can be made the subject of an independent claim, a divisional application, or a subsequent application. This also applies to technical teachings described in the description, which may constitute an invention that is independent of the features of the independent claims.

A first aspect of the invention relates to a system for controlling a stop function or a door opening function of a vehicle.

This applies in particular to a vehicle that is designed for automated driving.

The stop function is an automatically executed stopping operation, such as an emergency stop, for example in the form of a so-called "Minimal Risk Maneuver".

The system comprises an actuation element designed to generate an actuation signal depending on an actuation by a vehicle occupant.

For example, the actuation element can be designed in the form of an electrical switch or pushbutton in the vicinity of a vehicle door. It can be arranged, for example, on an inner side of the vehicle door.

The actuation signal can be, for example, an electrical actuation signal that is generated when the actuation element is actuated.

In addition, the system comprises a control device which is configured to receive the actuation signal and to trigger either the stop function or door opening function in response to receiving the actuation signal and depending on the driving speed of the vehicle.

The driving speed of the vehicle here is understood to mean a present driving speed of the vehicle.

For example, after receiving the actuation signal from the actuation element, the control device can generate a corresponding control signal, depending on the driving speed, which triggers or controls the automatic stop function.

The invention is based on the idea of integrating the actuating functions for a stop function and for a door opening function into a single control element. For example, a stop request button for an autonomously driven vehicle can be integrated with an existing door opening switch. This means that only one button and, if applicable, only one evaluation logic for an actuation signal generated by the button is required.

The risk of confusion between multiple switches on the part of the vehicle occupant is thus eliminated.

Combining both functions (stop request and door opening request) into one actuation request makes it necessary to be able to differentiate between the two functions in order to identify the function actually required.

The invention is based on the insight that such a differentiation can be made on the basis of the driving speed.

The basic idea in this respect is to define a specific driving speed range for the two functions, at which it is appropriate to trigger the relevant function.

Thus, in accordance with one embodiment the control device can be configured to trigger the stop function at driving speeds in a first speed range and to trigger the door opening function at driving speeds in a second speed range, the triggering in each case occurring in response to receiving the actuation signal.

In this case, according to a preferred embodiment variant the control device is configured to trigger the stop function after receiving the actuation signal, if the driving speed is greater than a stop request speed limit and, after receiving the actuation signal, to trigger the door open function if the driving speed is less than a door opening speed limit.

In other words, in this variant, the first speed range comprises speeds that are greater than the stop request speed limit, and the second speed range comprises speeds less than the door opening speed limit.

According to one embodiment, the stop request speed limit and the door opening speed limit are each in the range of a slow walking pace, i.e. for example in the range from 2 km/h to 6 km/h, preferably in the range from 3 km/h to 5 km/h, e.g. at 4 km/h.

The stop request speed limit is preferably greater than the door opening speed limit or equal to the door opening speed limit. In other words, according to some embodiments, a certain interval may be provided between the stop request speed limit and the door opening speed limit. In other embodiments, the values of the stop request speed limit and the door opening speed limit can be the same.

According to the above it may be provided, for example, that a function of the actuation element is enabled as a door opening button if the vehicle is stationary or moving at a slow walking pace (e.g. at speeds <4 km/h). Under such circumstances, a door opening request also seems to be feasible. In contrast, a function of the actuation element as a stop request button can be enabled if the vehicle is moving at a significant speed (e.g. >4 km/h), so that a stop request can be feasible.

According to an advantageous embodiment variant, the control device is configured to trigger the door opening function in response to the actuation signal after a first door opening speed limit (e.g. 3 km/h) has been undershot from the direction of higher driving speeds and as long as a first stop request speed limit (e.g. 4 km/h), which is higher than the first door opening speed limit, is not exceeded (again) thereafter.

It can also be provided that the control device is configured to trigger the stop function in response to the actuation signal after the first door opening speed limit has been undershot from the direction of higher driving speeds and the first stop request speed limit has then been exceeded (again).

In addition or alternatively, the control device may be configured to trigger the stop function in response to the actuation signal after a second stop request speed limit (e.g. 5 km/h) has been exceeded from the direction of lower driving speeds and as long as a second door opening speed limit (e.g. 4 km/h), which is lower than the second stop request speed limit, is not undershot (again) thereafter.

It can also be provided that the control device is configured to trigger the door opening function in response to the actuation signal after the second stop request speed limit has been exceeded from the direction of lower driving speeds and the second door opening speed limit has then been exceeded (again).

According to some embodiments, the second stop request speed limit can be greater than the first stop request speed limit.

Alternatively or in addition, the second door opening speed limit can be greater than the first door opening speed limit.

In other embodiments, the first stop request speed limit may be equal to the second stop request speed limit and/or the first door opening speed limit may be equal to the second door opening speed limit.

With the embodiment variants described above, the function assignment of the actuation element can therefore be provided with hysteresis. This can be used to ensure functional stability by, for example, preventing a certain speed limit from being repeatedly undershot and exceeded while the actuation element is being operated, causing the function assignment of the actuation element to change rapidly back and forth between stop request and door opening. The hysteresis can thus prevent the function assignment of the actuation element as perceived by the vehicle occupant from being temporarily undefined.

It is also within the scope of the invention that the control device can be a distributed control device, i.e. that it can comprise, for example, a plurality of control units or can be functionally distributed over a plurality of control units.

Preferably, such control units and, if applicable, other components (such as a databus system) can be used that are already present in the vehicle. Therefore, in some circumstances—in particular if a door opening button is already present in the vehicle door—no dedicated hardware components need be added in order to implement a system according to the invention.

In accordance with an advantageous embodiment, the control device comprises in particular a door control unit arranged in a vehicle door of the vehicle (hereafter also abbreviated to "Door-CU"). The door control unit is configured to evaluate an actuation state of the actuation element.

For example, the door control unit can be configured to receive the actuation signal from the actuation element and to determine an actuation state from the actuation signal. This actuation state can then be provided for further processing, possibly to other components of the control device, such as a vehicle-body control unit and/or an automated driving control unit.

In addition, the door control unit may be configured to control, for example, a locking mechanism for the vehicle door and/or a vehicle window arranged in the vehicle door.

As an alternative to or in addition to a door control unit, according to one embodiment the control device can comprise a vehicle body control unit (hereafter also abbreviated to "VB-CU"). The vehicle body control unit can be arranged in the vehicle, for example, in the region of a driver's footwell. For example, such a vehicle body control unit may be generally configured to control light functions, window opener functions, central locking functions, and the like.

The vehicle body control unit is preferentially configured to receive information relating to an actuation state of the actuation element (e.g. of the door control unit).

According to one embodiment variant, the vehicle body control unit can also be configured to further process the actuation state, e.g. to determine whether the door opening function or the stop function should be performed. Alternatively, the vehicle body control unit may be configured to forward the actuation state to another component of the control device, such as an autonomous driving control unit.

It is also within the scope of the invention that the control device may comprise an automated driving control unit (hereafter also referred to as "AD control unit" or "AD-CU"). Such a control unit can comprise, for example, a processor and a memory device, which are configured to control autonomous driving functions of the vehicle.

According to a preferred embodiment, the AD control unit is configured to receive information relating to an actuation state of the actuation element (e.g. of a door control unit and/or a vehicle-body control unit and/or via a vehicle databus system).

The AD control unit can also be designed, according to one variant, to process the received information further in order to determine whether the door opening function or the stop function should be performed.

Alternatively, the AD control unit can, for example, already obtain a fully formed trigger signal for the stop function from other components of the control device, such as the vehicle-body control unit, if the appropriate conditions are met. In this case, the corresponding evaluation of the actuation state information, taking into account the driving speed, may have already been carried out, for example, by the vehicle-body control unit.

A second aspect of the invention relates to a method for controlling a stop function or a door opening function of a vehicle using a system according to the first aspect of the invention.

One step of the method involves receiving the actuation signal by means of the control device.

A further step involves determining (in the sense of establishing) by means of the control device whether the driving speed of the vehicle is within a first speed range or a second speed range.

In a further step, the control device (in response to receiving the actuation signal and, if applicable, depending on other conditions, relating for example to an actuation duration, as described in more detail below) triggers the stop function if the driving speed is within the first speed range.

Alternatively, the door opening function is triggered (in response to receiving the actuation signal and, if applicable, depending on other conditions) if the driving speed is within the second speed range.

According to a development it may then also be provided that the triggering of the stop function and/or the door opening function depends on the duration of the actuation of the actuation element.

In this way, an additional triggering criterion can be provided, in particular for the stop function. For example, an option may be provided to trigger the stop function only in the case of a so-called long press, i.e. when a detected actuation duration of the actuation element exceeds a predefined actuation duration limit.

In accordance with this, the method in accordance with a preferred embodiment can comprise the following steps executed by means of the control device: determining whether the actuation duration of the actuation element is greater than an actuation duration limit (optionally also equal to the actuation limit); and (in response to receiving the actuation signal and optionally depending on other conditions) triggering the stop function if the driving speed is within the first speed range and if the actuation duration is greater than the actuation duration limit (optionally also equal to the actuation duration limit).

The actuation duration limit can be, for example, in the range from 600 to 900 ms, preferably in the range from 700 ms to 800 ms and, for example, 750 ms. The actuation duration limit may also be designed to be adjustable, e.g. within a range between 0 and 3 s.

The above comments on the system according to the invention according to the first aspect of the invention also apply in a corresponding way to the method according to the invention according to the second aspect of the invention. Advantageous exemplary embodiments of the method according to the invention that are not explicitly described in this section or in the claims correspond to the advantageous exemplary embodiments of the system according to the invention described above or described in the claims.

The invention is described in further detail below using exemplary embodiments and with the aid of the attached drawings.

DETAILED DESCRIPTION OF THE DRAWINGS

Figure 1:
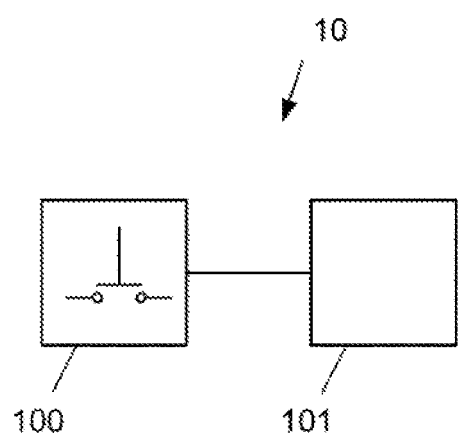
FIG. 1 is a schematic exemplary drawing of a system for controlling a stop function or a door opening function.

FIG. 1 shows a schematic exemplary drawing of a system 10 for selectively controlling a stop function or a door opening function of a vehicle 1.

The system comprises an actuation element 100, which can be designed, for example, as an electrical pushbutton. In addition, the system comprises a control device 101, which is communicatively connected to the actuation element 100.

The control device 101 can comprise, for example, one or more processors and any associated memory devices. The control device 101 can in principle also be a distributed control device 101, which comprises, for example, a plurality of control units, as explained below with reference to FIG. 2.

Figure 2:
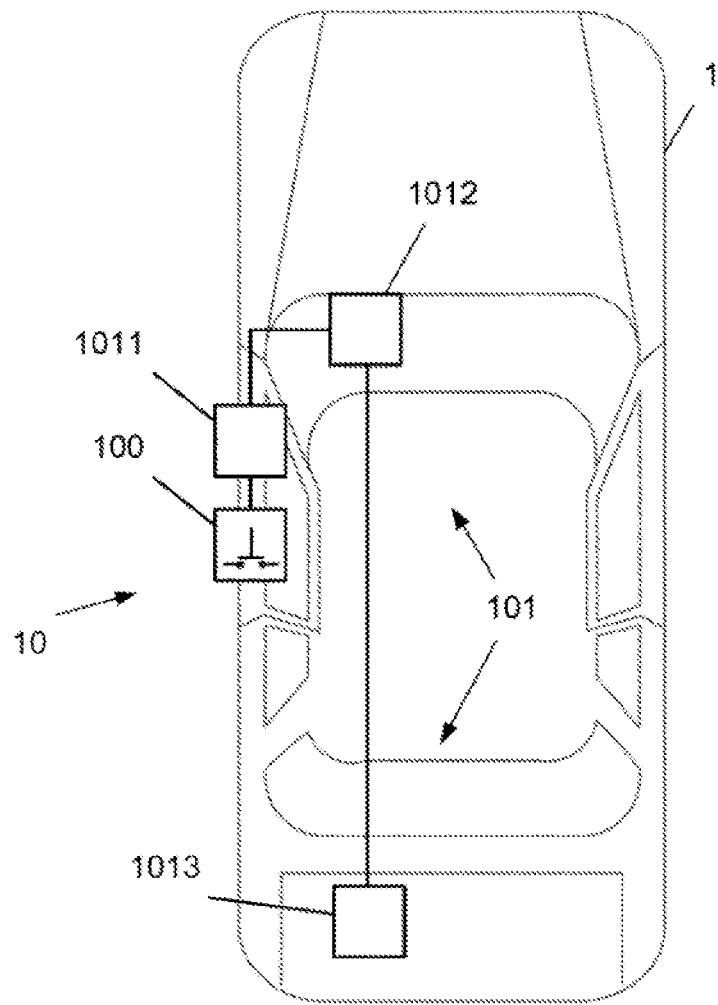
FIG. 2 is a schematic exemplary drawing of a system for controlling a stop function or a door opening function.

FIG. 2 shows an exemplary and schematic view of a system 10, which is arranged in a vehicle 1. The vehicle 1 is shown in a plan view. The actuation element 100 is arranged on an inside of a vehicle door. The example here shows only one actuation element 100. However, it is understood that additional vehicle doors, in particular every vehicle door, may also be provided with such actuation elements.

In the exemplary embodiment according to FIG. 2, the actuation element 100 is also communicatively connected to a control device 101. The control device 101 comprises a door control unit 1011, a vehicle-body control unit 1012, and an automated driving control unit (AD control unit) 1013. The above-mentioned control units 1011, 1012, 1013 and the actuation element 100 are communicatively connected to one another, for example via a databus system of the vehicle 1.

Figure 3:
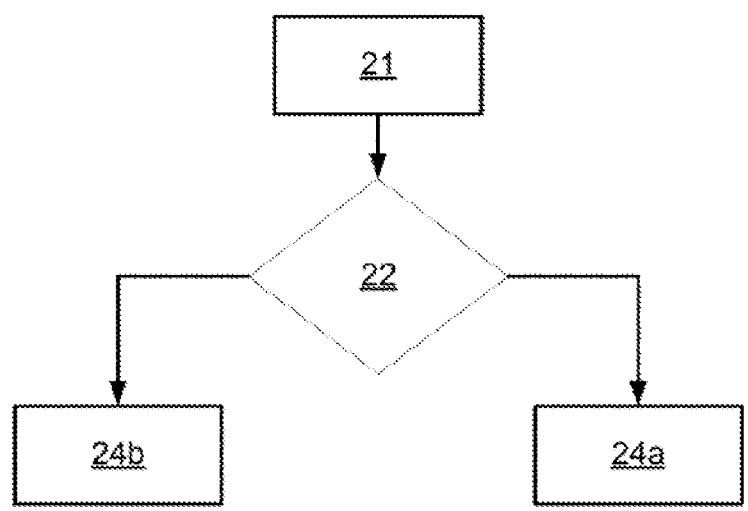
FIG. 3 is a schematic flow chart of a method for controlling a stop function or a door opening function.
Figure 4:
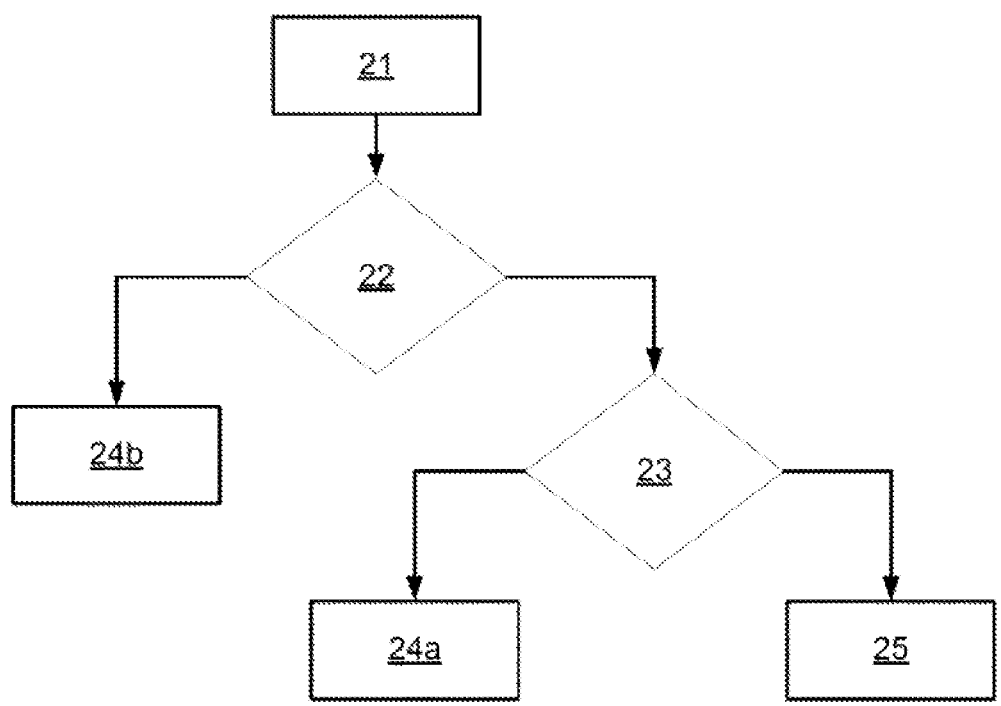
FIG. 4 is a schematic flow chart of a method for controlling a stop function or a door opening function.

The following text explains the operation of the system 10 in accordance with FIGS. 1 and 2, at the same time also making reference to the method steps 21, 22, 23, 24a, 24b, 25, which are schematically illustrated in FIGS. 3 and 4.

FIG. 3 shows an exemplary and schematic method sequence according to one embodiment, and FIG. 4 illustrates an extension of the method sequence according to FIG. 3 with optional additional method steps.

Firstly, in a step 21 illustrated in FIGS. 3 and 4, the control device 101 receives an actuation signal as a result of the actuation of the actuation element 100 by an occupant of the vehicle.

For example, referring to the exemplary embodiment in FIG. 2, the door control unit 1011 can receive the actuation signal. The door control unit is preferably configured to generate a logical operating state based on the actuation signal (e.g. "1" for actuation, i.e. the door button 100 is pressed, or "0" for no actuation). An initial logical evaluation of the actuation signal can therefore be carried out directly in the vehicle door.

This is illustrated in the left-hand column of the tables 1 and 2 shown below, which illustrate two examples of alternative processing sequences for logical states in the context of the method involving the door control unit (Door-CU) 1011, the vehicle-body control unit (VB-CU) 1012 and the automatic driving control unit (AD-CU) 1013.

TABLE 1

State processing by door CU, VB-CU and AD-CU

| Door-CU sends status of door button (1 = pressed) | VB-CU generates status of long press | VB-CU has status of V-threshold (V > 4 km/h) | VB-CU generates status of emergency stop | AD-CU performs emergency stop |
|---|---|---|---|---|
| 0 | 0 | 0 | 0 | 0 |
| 1 (<x sec.) | 0 | 0 | 0 | 0 |
| 1 (>x sec) | 1 | 0 | 0 | 0 |
| 0 | 0 | 1 | 0 | 0 |
| 1 (<x sec) | 0 | 1 | 0 | 0 |
| 1 (>x sec.) | 1 | 1 | 1 | emergency stop |

TABLE 2

State processing by door-CU and AD-CU

| Door-CU sends status of door button (1 = pressed) | AD-CU generates status of long press | AD-CU has status of V-threshold (V > 4 km/h) | AD-CU generates status of emergency stop | AD-CU performs emergency stop |
|---|---|---|---|---|
| 0 | 0 | 0 | 0 | 0 |
| 1 (<x sec.) | 0 | 0 | 0 | 0 |
| 1 (>x sec.) | 1 | 0 | 0 | 0 |
| 0 | 0 | 1 | 0 | 0 |
| 1 (<x sec.) | 0 | 1 | 0 | 0 |
| 1 (>x sec.) | 1 | 1 | 1 | emergency stop |

The logical actuation state of the actuation element 100 generated by the door control unit 1011 can then be made available for further processing to other components of the control device 101, such as the vehicle body control unit 1012 (see Table 1) and/or directly to the AD control unit 1013 (see Table 2).

In a further step 22, shown schematically in FIGS. 3 and 4, the control device 101 determines whether the driving speed of the vehicle 1 is in a first speed range or in a second speed range.

For example, the first speed range can include speeds (in particular all speeds) greater than a predefined stop request speed limit, and the second speed range can include speeds (in particular all speeds) less than a predefined door opening speed limit.

The stop request speed limit and the door opening speed limit are preferably each located in the range of a walking pace, in particular a slow walking pace.

In the present exemplary embodiment, the stop request speed limit is equal to the door opening speed limit and is 4 km/h.

In other embodiments, the stop request speed limit can be greater than the door opening speed limit.

In addition, a hysteresis can be optionally implemented, in the sense that the relevant stop request limit or door opening limit depends on past events, in particular on whether the relevant limit is approached from higher or lower driving speeds. These variants have already been explained above.

However, the present exemplary embodiment assumes a single fixed speed limit of 4 km/h.

In Tables 1 and 2, this predefined speed value of 4 km/h is referred to as the "V-threshold". The third column in the table shows the result of the evaluation with respect to the driving speed (step 22): if the driving speed is greater than 4 km/h, a logical state "1" is generated by the vehicle body CU 1012 (see Table 1) or alternatively by the AD-CU 1013 (see Table 2); otherwise, a logical state "0" is generated.

If the evaluation in step 22 returns that the driving speed is not greater than 4 km/h, the control device 101 triggers the door opening function (see step 24b in FIGS. 3 and 4). The vehicle door is then unlocked electrically so that it can be opened under mechanical pressure.

An appropriate Check Control message (CCM), including a gong, can be optionally triggered to inform the vehicle occupant.

However, if the evaluation in step 22 has returned that the driving speed is greater than 4 km/h, the control device 101 triggers the stop function (step 24a in FIGS. 3 and 4).

As illustrated in FIG. 4, the triggering (step 24a) of the stop function can optionally be preceded by an additional step 23, in which the control device 101 determines whether an actuation duration of the actuation element 101 is greater than a predetermined actuation duration limit (hereafter also referred to as the "long-press time").

If the evaluation in step 23 returns that the actuation duration is shorter than the long-press time, the method ends at this point (see step 25 in FIG. 4), i.e. the stop function (step 24a) is not triggered in this case.

Such an intermediate step 23 is also provided for the exemplary logical state processing in accordance with Tables 1 and 2 (see columns 1 and 2 in both).

The actuation duration limit which defines a long press can be, for example, 750 ms. This means that a long press is present when the control is pressed to the switching point, held down for at least 750 ms (long-press time) and then released or held down for longer.

The triggering of the stop function according to step 24a occurs preferably after the long-press time has elapsed and is not triggered earlier, say by releasing the actuation element 101.

According to one embodiment variant, it can also be provided that the actuation duration limit is variably adjustable by means of an appropriate system configuration, e.g. in the range from 0 to 3 s.

It may also be optionally provided that in the event of a long press, an additional display is provided via display means available in the vehicle, such as touch screens (tablets), in order to provide a plausibility check of the actuation process and its consequences for the vehicle occupant. The display is preferably only provided at travel speeds greater than 4 km/h, i.e. if the condition related to the driving speed for triggering the stop function is also fulfilled.

In Tables 1 and 2, the actuation duration limit is given as "x sec." as an example. In this case, the information as to whether the actuation duration is greater than (possibly also greater than or equal to) or less than (possibly less than or equal to) the value of "x sec.", i.e. whether or not a long press has been performed, can be included, e.g. as an additional specification, in the logical state which is transferred from the door-CU 1011 to the vehicle-body CU 1012 or to the AD-CU 1013.

The vehicle-body CU 1012 or the AD-CU 1013 then receive or generate a corresponding logical state ("1" in case of a long press and "0" if not a long press), as shown in the second column of Tables 1 and 2.

To trigger the stop function, the vehicle-body CU 1012 or the AD-CU 1013 generates a corresponding logical state "1" (e.g. an emergency stop state). This is shown in the fourth columns of Tables 1 and 2, where a "1" is entered if the long-press and driving speed conditions are met and a "0" if this is not the case.

In the embodiment described in Table 1, the vehicle body CU 1012, based on the logical actuation state provided by the door-CU 1011, carries out the additional steps 22, 23 and 24*a* or 24*b* respectively, as described above.

For example, step 24*a* comprises generating an emergency stop state (state "1" in the fourth column of Table 1), which is then received by the AD-CU 1013. The AD-CU then implements the stop function as indicated in the fifth column of Table 1 ("Emergency stop").

In contrast, in the alternative embodiment as shown in Table 2, the AD-CU 1013 is configured, based on the actuation state provided by the door-CU 1011 (optionally via the vehicle-body CU 1012), to carry out steps 22, 23 and 24*a* itself and then, if necessary, to control an automatic emergency stop of the vehicle 1.

The invention claimed is:

1. A system for controlling a stop function or a door opening function of a vehicle, comprising:
   an actuation element designed to generate an actuation signal depending on an actuation by a vehicle occupant; and
   a processor configured to:
      trigger the stop function in response to a reception of the actuation signal and depending on a driving speed of the vehicle;
      trigger the door opening function in response to the reception of the actuation signal and depending on the driving speed of the vehicle;
      receive the actuation signal;
      determine whether to trigger either the stop function or the door opening function in response to the reception of the actuation signal and depending on the driving speed of the vehicle; and
      trigger the determined stop function or the determined door opening function;
   wherein the processor is configured to at least one of:
      trigger the door opening function in response to the actuation signal after a first door opening speed limit has been undershot from a direction of higher driving speeds and as long as a first stop request speed limit, which is higher than the first door opening speed limit, is not exceeded thereafter; or
      trigger the stop function in response to the actuation signal after a second stop request speed limit has been exceeded from the direction of lower driving speeds and as long as a second door opening speed limit, which is lower than the second stop request speed limit, is not undershot thereafter.

2. The system according to claim 1, wherein:
   the processor is configured to trigger the stop function in a case of travel speeds in a first speed range and to trigger the door opening function in a case of travel speeds in a second speed range.

3. The system according to claim 2, wherein:
   the processor is configured to trigger the stop function when the driving speed is greater than a stop request speed limit and to trigger the door opening function when the driving speed is less than a door opening speed limit.

4. The system according to claim 3, wherein:
   the stop request speed limit is greater than the door opening speed limit or equal to the door opening speed limit.

5. The system according to claim 1, wherein:
   the processor is configured to trigger the stop function in response to the actuation signal after the first door opening speed limit has been first undershot from the direction of higher driving speeds and the first stop request speed limit has then been exceeded.

6. A method for controlling a stop function or a door opening function of a vehicle, comprising:
   receiving, via a processor, an actuation signal that depends on an actuation by a vehicle occupant, the control device being configured to trigger the stop function in response to a reception of the actuation signal and depending on a driving speed of the vehicle and configured to trigger the door opening function in response to the reception of the actuation signal and depending on the driving speed of the vehicle;
   in response to receipt of the actuation signal, determining, via the processor, whether to trigger the stop function or the door opening function based on whether the driving speed of the vehicle is within a first speed range or a second speed range;
   triggering, via the processor, the stop function when the driving speed is within the first speed range; and
   triggering, via the processor, the door opening function when the driving speed is within the second speed range;
   wherein the processor is configured to at least one of:
      trigger the door opening function in response to the actuation signal after a first door opening speed limit has been undershot from a direction of higher driving speeds and as long as a first stop request speed limit, which is higher than the first door opening speed limit, is not exceeded thereafter; or
      trigger the stop function in response to the actuation signal after a second stop request speed limit has been exceeded from the direction of lower driving speeds and as long as a second door opening speed limit, which is lower than the second stop request speed limit, is not undershot thereafter.

7. The method according to claim 6, wherein:

the triggering of the stop function or the door opening function is carried out according to a duration of the actuation by the vehicle occupant.

8. The method according to claim 6, further comprising:

determining whether an actuation duration by the vehicle occupant is greater than an actuation duration limit; and triggering the stop function when the driving speed is within the first speed range and the actuation duration is greater than the actuation duration limit.

9. The method according to claim 6, wherein:

the processor is configured to trigger the stop function when the driving speed is greater than a stop request speed limit and to trigger the door opening function when the driving speed is less than a door opening speed limit.

10. The method according to claim 9, wherein:

the stop request speed limit is greater than the door opening speed limit or equal to the door opening speed limit.

11. The method according to claim 6, wherein:

the processor is configured to trigger the stop function in response to the actuation signal after the first door opening speed limit has been first undershot from the direction of higher driving speeds and the first stop request speed limit has then been exceeded.

12. The method according to claim 6, wherein:

the processor is configured to trigger the door opening function in response to the actuation signal after the second stop request speed limit has been first exceeded from the direction of lower driving speeds and the second door opening speed limit has then been undershot.

* * * * *